United States Patent Office 3,409,434

Patented Nov. 5, 1968

3,409,434

RESIN PRECOATED DIAZOTYPE PAPERS

Maurice J. Landberge, Santa Barbara, Calif., Mark L. Moskowitz, Endwell, and Frank P. Kolesinskas, Binghamton, N.Y., assignors to GAF Corporation, a corporation of Delaware No Drawing. Filed Oct. 28, 1965, Ser. No. 505,459

7 Claims. (Cl. 96—75)

The present invention relates in general to the provision of insolubilized resin precoats on absorbent supports and more particularly, to the provision of resin precoated papers advantageously adapted for use in connection with the preparation of light-sensitive diazotype elements.

As is well known, the manufacture of light-sensitive diazotype materials involves the application to a fibrous base, such as paper, of a sensitizing solution comprising one or more stabilized light-sensitive diazonium compounds. The latter are characterized in that upon exposure to actinic radiation they undergo a photolytic decomposition being thus rendered incapable of coupling with an azo coupling component. In the processing of such materials they are exposed to light under a pattern, e.g., photographic transparency, line drawing or the like, whereby the light-sensitive diazonium compound is decomposed imagewise in accordance with the light transmitted by the pattern.

In the case of two-component diazotype materials, i.e., wherein one or more coupling components as well as suitable stabilizers against pre-coupling are incorporated into the sensitizing composition, a positive dye image is formed by subjecting the exposed element to an alkaline environment, preferably an ammonia atmosphere, to initiate the coupling reaction between undecomposed diazonium and coupler. In the case of one-component layers which contain only a stabilized light-sensitive diazo compound without a coupling component, the latter may be applied in a developer solution.

Despite the advantages inherent in the diazotype process, some difficulty has nevertheless been encountered heretofore in obtaining the desired image dye density and especially when adsorbent materials are utilized as the support members. As will be readily apparent, the extent of diazonium destruction and, therefore, the printing speed, will depend primarily upon the availability of the diazonium compound to the direct effects of the exposure radiation. Furthermore, since both the image dye density and contrast obtainable are direct functions of the diazo concentration in both the exposed and non-exposed areas it is self-evident that the degree to which the diazonium salts accumulate and are retained at or near the surface of the base is of paramount importance.

The very nature of the process of manufacturing the diazo-type material, however, tends to militate against the desired coating result, namely the accumulation and retention of diazonium salts at the base surface. Thus, the support materials employed are usually absorbent in nature while the sensitizing components are ordinarily applied thereto from an aqueous solution. Consequently, there is a pronounced tendency for the components of the sensitizing solution to diffuse or otherwise migrate into the fibrous base material with the consequence that the amount of sensitizer available to the exposure radiation is reduced significantly. As a result of such spurious sensitizer penetration the light-sensitive material obtained is invariably characterized by low printing speed, image dye density, etc. Moreover, the fugitive sensitizer, coupler, etc., tends to contribute appreciably to background as well as image discoloration on the resultant copy thereby vitiating the possibility of obtaining adequate contrast.

Undesired penetration of sensitizer solution into the fibrous support material has been noted to obtain to a significant extent, despite the use of coating techniques involving rapid drying operations.

An additional source of difficulty stems from the fact that the fibrous support material usually employed is not in most cases adapted for the soaking operations connected with development, fixing and washing of the diazotype material. Not only has the paper support portion of the diazotype element been susceptible to change such as loss of wet strength, but in addition the sensitizing layer itself has invariably been adversely affected as manifested by such difficulties as blistering, frilling, and the like.

In an effort to overcome or otherwise alleviate the foregoing and related problems the art has resorted to a wide variety of remedial techniques which, in the main, have provided only marginal improvement. Perhaps foremost among the techniques heretofore evolved are those based on the provision of intermediate or precoat layers on the absorbent support which purportedly function as barrier layers for preventing penetration of sensitizing solution into the body of the support material. A wide variety of materials have been proposed for use in this connection ranging from inorganic pigments to organic resinous materials, etc. However, for effective use it is usually required that such materials be employed in considerable amounts with the consequence that the print copy is deleteriously affected; for example darkening of the print upon exposure to heat, light, etc. tends to be accelerated while the distribution of the sensitizing composition is non-uniform thus leading to defective reproduction.

The use of organic, film-forming polymeric materials has proved particularly effective and accordingly has enjoyed a significant measure of commercial acceptance. Usually, such polymeric materials are hydrophilic to some extent either by virtue of some degree of water solubility, e.g., polyvinyl alcohol, hydrolyzed polyvinyl acetates and the like, or, as with polymers which although ordinarily hydrophilic are nevertheless water sensitive and/or water permeable when applied to the support material from aqueous media, e.g., dispersion, suspension or emulsion. Such water sensitive resins have been found to lack the requisite impermeability to aqueous media, and thus their capacity to retard spurious penetration of diazo sensitizing solutions into the absorbent base leaves something to be desired. It has thus become a recognized practice to provide such resin precoating compositions with gelling, i.e., hardening, agents which function to insolubilize the resin precoat and especially in those instances wherein the resin employed is water soluble, e.g., polyvinyl alcohol. The usual procedure involves adding predetermined amounts of such gelling agents to the resin media prior to applying same to the fibrous support. However, the viscosity increase of resin compositions so modified upon standing renders their handling rather critical and imposes severe limitations upon the coating time and total quantity of coating composition which can be effectively employed in a single batch. Consequently, even in small batches, it is often found necessary to compensate for such undesired viscosity increases by suitable adjustments of the coating apparatus. In any event, the hardening agents thus far provided in this connection whether incorporated directly into the resin precoat solution or deposited as a separate precoating prior to applying the resin layer, have failed to provide optimum results as regards such particulars as degree of resin insolubilization, mitigation of background discoloration, etc. and especially where the coated element in question is contemplated for uses involving high-temperature processing, e.g., thermal diazotype papers.

Thus, a primary object of the present invention resides in the provision of resin pre-coated absorbent sheet materials advantageously adapted for use in the preparation of light-sensitive diazotype elements wherein the above and related disadvantages are eliminated or at least alleviated to a substantial extent.

Another object of the present invention resides in the provision of diazotype elements having a resin precoating layer characterized by outstanding resistance to penetration by aqueous sensitizing media.

A further object of the present invention resides in the provision of an improved, insolubilized resin precoating for diazotype paper which imparts thereto exceptional wet strength and reduced brittleness without the necessity of plasticization.

A still further object of the present invention resides in the provision of diazotype elements having an insolubilized polyvinyl alcohol resin precoating which when processed yield photographic images of improved dye density, contrast, brightness, etc. in the absence of blistering, frilling, and the like.

Other objects of the present invention will become apparent hereinafter as the description thereof proceeds.

The attainment of the above and related objects is made possible in accordance with the present invention which in its broader aspects provides a process for the preparation of an insolubilized resin coating on an absorbent support utilizing a resin material having hydrophilic properties which comprises first coating the surface of the support to be treated with an insolubilization catalyst comprising a boron acid compound and thereafter applying to the surface so treated a coating composition comprising an organic resinous material which is water soluble to water sensitive.

The boron acid compounds found to be eminently suitable as gelling, i.e., insolubilizing agents for use in accordance with the present invention comprise in general boron acid compounds which yield borate ions in aqueous solution, e.g., boric acid, its esters and salts. As particular examples of boron compounds there may be mentioned without limitation the alkali material tetraborates and metaborates, e.g., sodium tetraborate, sodium metaborate, potassium tetraborate, etc., orthoboric acid, metaboric acid, boric anhydride, glyceryl borate, glycerol boriborate; the sorbitol, mannitol and dulcitol monoborates and diborates, etc. and salts thereof with water-solubilizing cations, e.g., sodium potassium, ammonium and the like. Moreover, suitable boric acid esters can be prepared by reacting a polyhydric alcohol, e.g., ethylene glycol, diethylene glycol, triethylene glycol, erythrol, sorbitol and mannitol with boric acid or a mixture of boric acid and borax at elevated temperatures, e.g., 100 to 160° C.

Boron acid derivatives of the foregoing type though of relatively high molecular weight and complex structure readily dissolve in water to yield borate ions.

The boron acid compound may be readily applied to the fibrous support from an aqueous solution, dispersion, emulsion, etc., or from a solvent which may be prepared in any desired concentration. For example, it has been found that solutions having a borate ion concentration ranging from about 0.5% to about 5% are eminently effective. It will be readily appreciated that the amount of boron acid compound deposited upon the fibrous support should be sufficient to permit the attainment of the requisite degree of resin insolubilization and of course should be substantially, uniformly distributed thereupon. This, of course, will in turn be influenced by such factors as the thickness of the subsequently applied resin coating and the molecular weight as well as water sensitivity of the involved resin. The resin precoat is usually deposited to a uniform thickness within the range of about 0.1 to about 0.4 mil with thicknesses on the order of about 0.2 mil (0.002 inch) being preferred. Accordingly, optimum concentrations of boron acid compound in terms of coated area can be readily determined in a particular instance by routine experimentation. However, in general, it is found that the requisite degree of resin insolubilization can be achieved by the deposition of boron acid compound on the fibrous support in amounts sufficient to yield a surface concentration within the range of about .025 to about 0.5 gram per square foot of coated area.

As indicated hereinbefore, the process of the present invention is applicable in general to the preparation of insolubilized resin precoats wherein the polymeric resin material possesses hydrophilic properties. However, the noted improvements are particularly manifest with the hydroxyl-containing polymers including for example, alginic acid, carboxymethyl cellulose and polymers which contain a plurality of recurring, intralinear vinyl alcohol (—$CH_2$—CHOH—) groups such as polyvinyl alcohol and its partially hydrolyzed, water-soluble lower fatty acid esters, lower alkyl ethers and lower acetals. As is well known, polyvinyl alcohol is a tough, water-white, polymeric film-forming material being readily soluble in water. The more highly polymerized varieties are soluble in hot water while the intermediate or lower molecular weight polymers are soluble in cold water. Such polymers are usually prepared commercially by hydrolysis of polyvinyl esters such as polyvinyl acetate, polyvinyl isobutyrate, etc., the extent of hydrolysis, of course, determining the degree of water solubility. The ethers are usually prepared by incomplete etherification of partially or completely hydrolyzed polyvinyl acetate. The polyvinyl acetals, e.g., polyvinyl acetaldehyde, polyvinyl isobutyral, etc., are usually prepared by acetalization of polyvinyl alcohol and its incompletely hydrolyzed carboxylic acid esters.

Additional examples of synthetic hydroxyl polymers, contemplated for use herein include the partially and completely hydrolyzed polyvinyl esters, e.g., vinyl acetate and copolymers thereof with ethylenically unsaturated compounds such as vinyl chloride and styrene; acrylic acid esters, e.g., methyl acrylate; methacrylic acid esters, e.g., methacrylate; as well as olefins, e.g., ethylene.

In the preparation of polyvinyl alcohol precoated diazotype papers, polyvinyl alcohol polymers are usually preferred wherein the vinyl alcohol units comprise at least 75% of the polymer.

It is the usual practice in preparing diazotype elements to include in the resin precoating composition additional materials such as pigments, e.g., silica, alumina, etc., coating aids, e.g., saponin and the like. The composition is prepared by intimately mixing the involved ingredients, e.g., resin, coating aid, pigment, etc., in the desired proportions in an aqueous medium and diluting with water to the desired solids concentration. The proportions of the various ingredients are not particularly critical. In general, however, the amount of pigment employed ranges from about 1 to 10% and preferably from about 2 to 5% by weight of coating composition. The resin component, e.g., polyvinyl alcohol usually comprises 1 to 10% and preferably from about 3 to 6% by weight of the coating composition. In any event, it is preferred to employ approximately equal parts by weight of resin and pigment, i.e., the relative proportions of pigment and resin should be maintained within a ratio of from about 3:2 to 2:3. The coating aid, e.g., saponin is conventionally employed in amounts ranging up to 0.1% by weight of the coating composition. In general, it is found that compositions having the aforementioned preferred concentrations are particularly advantageous for coating paper stock.

The composition can thereafter be applied to the base material according to well established coating techniques, e.g., brush coating, roller coating, spraying, etc.

The base or support materials contemplated for use in accordance with the present invention comprise in general any materials which are of an absorbent nature. As examples of such base materials there may be mentioned various types of paper, including opaque and transparent rag and sulfite stocks, card stock, opaque and transparent cloth, asbestos, plastic impregnated glass fibers, plaster, porous stone, etc.

In accordance with the process provided by the present invention, the absorbent support material is first treated with the boron medium, preferably an aqueous solution, to yield a surface having a borate concentration of at least .025 gram per square foot of coated surface and allowed to dry. Thereafter the resin precoating composition is coated upon the surface thus treated to the desired thickness. Almost immediately upon application of the resin precoat layer the gelling reaction is initiated whereupon the precoat layer is transformed into an insolubilized mass. The insolubilization reaction proceeds readily at room temperature although elevated temperatures may be employed if desired. In any event, the requisite degree of resin insolubilization can be readily obtained by merely allowing the coating element to stand at room temperature. Upon substantial cessation of the gelling reaction, the insolubilized resin layer can be sensitized by treating same with a one or two-component diazo sensitizing solution suitable for the intended purpose and mode of operation. Such compositions are well known in the diazotype art and in this connection reference is made to the diazo sensitizing compositions described in, for example, U.S. Patents 3,102,812 and 3,163,535.

In using the diazotype photoprinting materials prepared in accordance with the present invention it has been found that the results obtained are markedly superior when compared to diazotype materials prepared via prior art techniques, i.e., utilizing the gelling agents currently known. Specifically, the process of the present invention provides diazotype materials which when processed yield prints characterized by superior image reproduction, i.e., density, contrast, brightness, sharpness, etc. Moreover, since the insolubilized resin layer displays a vastly improved impermeability to aqueous sensitizing media applied thereto, the thickness and/or concentration of the resin component of the precoat composition can be correspondingly reduced. This presents a significant advantage since it is well known that the use of the resin in high concentration invariably produces a layer which tends to become lumpy and sticky with the inevitable consequence that the diazotype sensitizing solution subsequently applied will be non-uniformly distributed. Thus, the present invention makes possible a more efficient utilization of diazo sensitizing as a result of (1) the substantial elimination of any loss of sensitizing solution due to diffusion into the base material and (2) a more uniform distribution of diazo sensitizer when applied to the resin layer.

The method of the present invention can likewise be utilized in connection with the paper manufacturing operation, e.g., the boron compound can be included for example as part of a size press application. As a result the boron compound will permeate the entire matrix of the paper body and be substantially uniformly distributed throughout same. This procedure represents a particularly desirable embodiment of the present invention since, in the vast majority of instances, prior attempts to apply a resin precoat in a size press have been unsatisfactory. This method presents the advantage that any additional step involving a boron compound coating operation which would otherwise be required, is eliminated. In order to assure that adequate amounts of boron compound, i.e., within the range stated above, be present at the surface regions of the paper product and thus be available for direct contact with the subsequently applied resin coating, it is in general advisable to employ boron treatment solutions having a relatively high borate ion concentration; i.e., ranging from about 2.5 to 5% with a range of 3.0 to 5% being particularly preferred.

The following examples are given for purposes of illustrating the present invention and are not to be considered limitative thereof:

Example I

A 100% rag 14 lb. transparent base paper stock is precoated with a 3% aqueous solution of sodium tetraborate (boxax) and dried to yield a coated layer having a tetraborate concentration of approximately 0.09 gram per square foot. The pretreated paper is then coated in conventional maner with a solution comprising:

| | Grams |
|---|---|
| Polyvinyl alcohol (Elvanol 70–05) | 5 |
| Saponin | 0.1 |
| Silica (Syloid 72) | 6 |
| Water to 100 ml. | |

to a thickness of approximately 0.2 mil and allowed to dry.

A second control sample is prepared in the same manner with the above composition except that the precoating step with sodium tetraborate is eliminated.

Each of the elements thus prepared is sensitized to the same print speed with a two-component blueline diazotype formulation of the following composition:

| | | |
|---|---|---|
| Water | cc | 100 |
| Citric acid | g | 8 |
| Zinc chloride | g | 5 |
| Thiourea | g | 5 |
| p-Diazo-N,N-diethyl-aniline-zinc chloride double salt | g | 2.4 |
| 2,3-dihydroxy-naphthalene-6-sulfonic acid | g | 3.0 |

After drying, each of the sensitized elements is subjected to the same exposure through a stepped density mask and developed by treatment with ammonia vapor.

In each case, there was obtained an image of bright, blue coloration. However, the maximum dye density obtained with the borax-pretreated sheet was found to be 1.13 while that obtained with the control sample was only 0.96. Moreover, the coloration obtained with the borax-pretreated element was much brighter and fuller while the lines were more shapely defined when compared to the control sample.

The following example illustrates the improvements provided by the present invention when utilized in connection with the preparation of precoat layers employing normally hydrophobic resinous materials but applied from aqueous media.

Example II

A transparent base paper stock of the type described in Example I is precoated with a 3% aqueous solution of sodium tetraborate and dried to yield a coated layer having a borate concentration of approximately 0.2 gram per square foot of coated surface. The pre-treated paper is then coated in conventional manner with a solution comprising:

| | | |
|---|---|---|
| Silica (Syloid 72) | g | 7.5 |
| Polyvinyl acetate emulsion (about 50% solids) | ml | 10 |
| Water to 100 ml. | | |

A second control sample is prepared in the same manner as the above composition but omitting the precoating step with sodium tetraborate.

Each of the elements is thereupon sensitized to the same print speed with the two-component diazotype formulation described in Example I. Following exposure and development of each of the film samples, there were obtained image reproduction similar in photographic quality to those of Example I. Again, however, the dye density contrast and resolution were markedly superior in the case of the borate pre-treated sample when compared to the control.

Example III

Example I is repeated except that a 5% aqueous solution of glyceryl borate is employed in lieu of sodium tetraborate as the pre-treatment solution. The solution is applied in such manner as to yield a glyceryl borate concentration of about 0.4 gram per square foot of coated surface. A control sample is likewise prepared in the same manner except that the pre-treatment step with glyceryl borate is omitted. Each of the elements is then exposed to a stepped density mask and developed in identical manner. Again, results similar to those described in the foregoing examples are obtained, i.e. the borate pre-treated element displayed marked superiority in terms of photographic quality of the image obtained.

Example IV

Example I is repeated except that sensitization of the resin precoated layer is effected with a one component diazo sensitizing solution of the following formula:

| | | |
|---|---|---|
| Water | cc | 100 |
| Citric Acid | g | 1 |
| Napthalene-2,36-tri-sulfonic acid | g | 2.2 |
| Diazo-N,N-ethyl-benzyl-aniline-zinc chloride double salt | g | 2.2 |

Again, a control sample is prepared but omitting the borate precoating step.

After drying, each of the sensitized precoated samples is subjected to identical exposure through a stepped density mask and developed by treatment with an aqueous developing solution of the following composition:

| | | |
|---|---|---|
| Water | cc | 100 |
| Sodium thiosulfate | g | 8 |
| Thiourea | g | 2 |
| Sodium carbonate | g | 2 |
| Phloroglucinol | g | 0.6 |
| Resorcinol | g | 0.5 |
| Sodium-isopropyl-naphthalene-sulfonate | g | 0.1 |

The results obtained indicate clearly that the photographic quality of the image obtained following exposure and development was markedly superior in the case of the borate pretreated sample.

The following examples illustrate the embodiment of the present invention wherein the treatment of the paper with the boron compound solution is carried out in connection with the paper manufacturing operation.

Example V

The resin pre-coating solution of Example I is coated upon a fibrous support comprising paper which has been sized with a 4% solution of sodium tetraborate (borax) in amounts sufficient to yield a tetraborate concentration in the surface regions of the paper of approximately 0.3 gram per sq. foot. The resin precoat is deposited to a thickness of approximately 0.2 mil and allowed to dry. A second control sample is prepared utilizing a paper base which has not been sized with a boron compound.

Each of the samples is sensitized to the same print speed with the two-component diazotype formulation described in Example I. Following exposure and development of each of the film samples, there were obtained image reproductions similar in photographic quality to those of Example I. Again, the dye density, contrast and resolution were markedly superior in the case of the borate-sized support sample when compared to the control.

Example VI

Example V is repeated except that the paper base employed is one which has been sized with a 5% aqueous solution of glyceryl borate so as to yield a borate concentration in the surface regions of the paper of approximately 0.4 gram per sq. ft. The results obtained following exposure and development clearly indicate a significant improvement in dye density and brightness, contrast and image resolution in the case of the glyceryl borate-sized sample when compared to the control.

Example VII

Example VI is repeated except that the sensitizing composition employed is of the one component type described in Example IV. Again, a control sample is prepared utilizing as the base, paper which has not been sized with a boron compound.

After drying, each of the sensitized precoated samples is subjected to identical exposure through a stepped density mask and developed by treatment with an aqueous developing solution of the following composition:

| | | |
|---|---|---|
| Water | cc | 100 |
| Sodium thiosulfate | g | 8 |
| Thiourea | g | 2 |
| Sodium carbonate | g | 2 |
| Phloroglucinol | g | 0.6 |
| Resorcinol | g | 0.5 |
| Sodium-isopropyl-naphthalene-sulfonate | g | 0.1 |

The sample having the glyceryl borate-sized paper base exhibited marked superiority in dye density and brightness, contrast and image resolution when compared to the control.

Results similar to those described above are obtained when the particular boron compounds exemplified are substituted in equivalent amounts and within the range specified by one or more of the following boron acid derivatives:

Orthoboric acid
Boric anhydride
Ammonium tetraborate
Boric acid/ethylene glycol reaction product, etc.

It will further be understood that the nature of the diazo and coupler compounds as well as the auxiliary ingredients, e.g., stabilizers, humectants, etc., are not critical factors in the practice of this invention and accordingly, any of the materials provided in this regard in the diazotype art can be employed as desired.

The present invention has been disclosed with respect to certain preferred embodiments thereof, and there will become obvious to persons skilled in the art various modifications, equivalents, or variations thereof which are intended to be included within the spirit and scope of this invention.

What is claimed is:

1. A diazotype photo printing material which comprises, in order, an absorbent base containing from about .025 to about .5 gram per sq. ft. of a boron compound which is capable of yielding borate ions in aqueous solution, a layer comprising a film-forming organic resin material having hydrophilic properties and a layer comprising a light-sensitive diazo compound.

2. A diazotype photo printing material which comprises, in order, a paper support having a layer comprising a boron compound which is capable of yielding borate ions in aqueous solution, a layer comprising a film-forming organic resin material having hydrophilic properties, and a layer comprising a light-sensitive diazo compound.

3. A diazotype photoprinting material according to claim 1 wherein said absorbent support comprises paper.

4. A diazotype photoprinting material according to claim 1 wherein said boron acid compound comprises sodium tetraborate.

5. A diazotype photoprinting material according to claim 1 wherein said resin comprises a synthetic hydroxyl polymer which contains a plurality of recurring intralinear vinyl alcohol groups.

6. A diazotype photoprinting material according to claim 5 wherein said synthetic hydroxyl polymer contains at least 75% vinyl alcohol units.

7. A diazotype photoprinting material according to claim 1 wherein said boron acid compound is substantially uniformly distributed throughout said paper support.

References Cited

UNITED STATES PATENTS

| | | | |
|---|---|---|---|
| 1,770,352 | 7/1930 | Murray | 96—75 |
| 2,405,523 | 8/1946 | Sease et al. | 96—91 XR |
| 2,657,137 | 10/1953 | Kessels | 96—91 XR |
| 2,970,909 | 2/1961 | Slimowicz | 96—91 |
| 3,030,210 | 4/1962 | Chebiniak | 96—75 |
| 3,123,472 | 3/1964 | Wilders et al. | 96—91 XR |
| 3,309,200 | 3/1967 | Berman et al. | 96—91 XR |
| 3,330,662 | 7/1967 | Jahoda et al. | 96—75 |

NORMAN G. TORCHIN, *Primary Examiner.*

C. BOWERS, *Assistant Examiner.*